United States Patent Office 3,067,109
Patented Dec. 4, 1962

3,067,109
METHOD FOR PRODUCING COBALAMINS
Abraham L. Baron, Hampton, Va., assignor to Chase Chemical Company, Newark, N.J., a corporation of New Jersey
No Drawing. Filed Mar. 31, 1960, Ser. No. 18,882
11 Claims. (Cl. 195—80)

This invention relates to the production of vitamin $B_{12}$ and vitamin $B_{12}$-like substances and more particularly to an improved process for producing such substances under microaerophilic fermentation conditions.

Vitamin $B_{12}$ and vitamin $B_{12}$-like substances, their properties, functions, and methods for their production have been the subject of a great deal of investigation. Such vitamin $B_{12}$-like substances are referred to hereinafter as cobalamins, the latter term being recognized and intended to include all those substances which are generally regarded as belonging to the vitamin $B_{12}$ group, i.e. those which exhibit vitamin $B_{12}$ activity irrespective of their chemical structure and having in common the biological functions and related biological properties attributable to such substances.

A variety of microorganisms are known to produce cobalamins and in many instances have been identified as to genus or genus and species. Most commonly acknowledged as well as most frequently mentioned in the technical and patent literature on this subject is the genus Streptomyces. Perhaps best known in this genus is the species *Streptomyces griseus*, although a number of other species within this genus are also known as productive of cobalamins. As other microorganisms known in the art for producting cobalamins, there may be mentioned *Flavobacterium devorans* and *Bacillus megaterium*. All of the aforementioned microorganisms have in common with many other cobalamin-producing species and genera, the property of being aerobic, i.e. their growth and proliferation in submerged culture and the elaboration of the cobalamins requires the aerobic state of metabolism throughout the fermentation process in which such microorganisms are employed. From a practical point of view, this requires the continuous addition of substantially large volumes of air to the culture nutrients throughout the fermentation period and with this addition the concomitant problems of aeration, including large air compressors, spargers, or other devices for air dispersion, equipment for large scale air sterilization, foaming and foam-breaking, along with the associated mechanical problems and the dangers of loss by contamination or over-flow of culture liquor. Partial or complete solutions to such problems have entailed a great deal of time, effort and expense in devising special methods and means therefor.

It is an object of this invention to provide an improved process for producing cobalamins which will avoid the above-mentioned problems. Another object of this invention is the provision of an improved fermentation process for producing cobalamins in improved yields and/or purity. Other objects and advantages will appear as the description proceeds.

The attainment of the above objects is made possible by the present invention wherein cobalamins are produced by the microaerophilic fermentation of an aqueous nutrient medium with bacteria of the genus Propionibacterium, the improvements embodied in this invention comprising employing in such fermentation a nutrient medium thickened sufficiently to hold the bacteria in suspension and/or in conjunction with the steps of allowing the fermentation to proceed without agitation during about the initial 5 to 35% of the fermentation period and with agitation during the remainder of the said period and/or while employing a member of the group consisting of malt extract and malted cereal extract in the nutrient medium as a source of bacterial growth factor and assimilable nitrogen.

In U.S. Patent 2,715,602, Hargrove and Leviton disclose the utility of bacteria of the genus Propionibacterium for producing cobalamins in a microaerophilic fermentation process. In order to increase the yield of cobalamins, the patentees propose to carry out the fermentation in a growth medium containing cobalt. While this process is of interest, the relatively low yields thus obtained would ordinarily prevent use thereof on a commercial scale. An important reason for such disadvantageous results resides in the fact that procedures and conditions have been employed which, although proven useful in aerobic fermentations, are unsuitable for carrying out the fermentation under the required microaerophilic conditions.

A microaerophilic condition is not clearly definable in terms of oxygen tension, but may briefly be defined as one that does not require substantially large volumes of air to be injected into the culture mass throughout the fermentation period as in an aerobic fermentation, nor on the other hand does it require the scrupulous removal of all air as in an anaerobic fermentation. The microaerophilic fermentation thrives in a situation in which the air supply is small and limited, e.g. bacteria of the genus Propionibacterium grow well in a fermenter or tank wherein the only oxygen present is in the residual air dissolved in the culture liquor or contained in the head space of the fermentation vessel above the surface of the culture liquor at the start of the fermentation process. In an aerobic fermentation, the bacterial cells are maintained in a constant state of suspension through the turbulence created by the large volumes of air injected into the culture liquor, but in a microaerophilic fermentation such injection of air is of course not possible without detrimental effects on cell growth. On the other hand, I have discovered that if the bacterial cells are kept in suspension by continuous vigorous agitation as by shaking or stirring with a propeller device, as done by Hargrove and Leviton, then the effect on cell growth is likewise detrimental. Hargrove and Leviton initiate their fermentation process by the preparation and inoculation of a fluid seed culture or inoculum into the nutrient fermentation liquor. Under these conditions, the bacterial cells growing microaerophilically unless stirred vigorously tend to settle to the bottom of the inoculum as well as the fermentation vessel. This results in poor bacterial growth and concomitant low yields of cobalamins. As pointed out above, vigorous agitation does not solve the problem and if the agitation is not vigorous the cells settle and yield poor results.

The present invention is in part based upon my discovery that by sufficiently thickening the nutrient medium, as by addition of a thickening agent to the seed culture medium or the fermentation liquor or both, the bacterial cells may be caused to remain in suspension in the medium without the aid of turbulence or vigorous agitation of any kind, and that the use of such a thickening medium is highly advantageous with respect to improvements in cell growth and vigor. As a further embodiment of this invention, I have made the unexpected observation that it is actually advantageous to maintain the fermentation mass unstirred in its initial stages followed by gently or occasional stirring of the mass, in order to distribute nutrients and metabolic products, after the bacterial cell growth has become well advanced and established. Under this regiment, along with increased cell growth there is a concomitant increase in the yield of the cobalamins. Further, the bacterial cells thereby become resistant to and/or readily adapted to tolerate relatively enormous concentrations of toxic substances to which under conventional conditions of fermentation they would be extraordinarily sensitive to and would cease to grow and the cells would perish. Examples of such substances are cyanide and cobalt compounds which are known to increase the yields of cobalamins but which must ordinarily be employed in low concentrations to avoid toxic effects upon the cells. As a result of the use of the present inventive concepts, it is possible to employ in the fermentation mass and/or in the seed or inoculum culture medium concentrations in excess of 20 p.p.m. of cobalt and in excess of 100 p.p.m. of cyanide ion, which concentrations are, under ordinary conditions, considered toxic levels.

In accordance with this invention, the culture medium under microaerophilic conditions should be thickened and its viscosity increased sufficiently to convert it into a semi-solid mass ranging from the consistency of say a thick paint to a thin gel, whereby the bacterial cells are prevented from settling to the bottom of the vessel. This is readily accomplished by the addition of suitable amounts of known thickening agents. It will of course be understood that the amount of thickening agent added in any particular instance will depend upon the nature of the agent since some such agents are more effective thickeners per unit weight than others. The thickening agents preferred herein for optimum results are agar in a concentration of about 0.1 to 2% by weight in the medium, and starch (e.g., corn starch) in a concentration of about 0.1 to 10% by weight in the medium. However, a number of other known thickening agents may be employed, as for example, methyl cellulose, carboxymethyl cellulose, carragenin, pectin, sodium alginate, gum tragacanth, polyvinyl pyrrolidone and the like.

The nutrient medium may contain the usual and known sources of assimilable carbon, assimilable nitrogen, growth factors, nutrient salts, cobalt and/or cyanide ion. The assimilable carbon may be provided by a carbohydrate such as dextrose, maltose, xylose, invert sugar, corn syrup, lactose, sucrose, beet or cane molasses, starch, or the like, as well as by other organic compounds such as lactic acid, gluconic acid, citric acid, glycerol, and the like. The amount of such assimilable carbon source may vary from 0.5 to 10% in the nutrient medium.

As the source of assimilable nitrogen, there may be mentioned amino acids or proteins such as contained in soy beans, oats, corn, wheat and other grains, yeast, yeast extracts, tryptic digest of casein, meat extract, blood meal, protein, meat and bone scrap, fish meals, fish solubles, peptone, peanut meal, cotton seed meal, corn steep liquor, lactalbumen, and the like. The assimilable nitrogen source may be employed in amounts of about 1% or more of the medium, preferably about 1 to 5%. In addition, as mentioned previously, I have discovered that malt extract and malted cereal extract are excellent sources of assimilable nitrogen. If desired, the fermentation may be carried out without the use of a carbohydrate, in which case the proteins or amino acids may serve as the source of both carbon and nitrogen required by the microorganism.

As a source of growth factor for Propionibacterium, in addition to yeast and yeast extract, the extracts of potato, corn, corn steep and liver, are claimed to be useful, and I have found in addition as previously mentioned that malt extract and malted cereal extract are particularly useful (vide infra).

Customary nutrient salts which may be employed in the fermentation medium include ammonium sulfate, magnesium sulfate, potassium phosphate dibasic, potassium phosphate monobasic, and the like.

Cobalt compounds are known to increase the yield of cobalamins when added to the fermentation medium, and addition of such compounds is accordingly desirable in the present process. As pointed out above, one of the advantages of this process resides in the fact that higher amounts of cobalt in the range ordinarily considered toxic to the microorganism may be employed. In general, the cobalt may be employed in the medium in amounts ranging from about 0.1 up to as high as 60 to 100 p.p.m., the cobalt being added preferably in the form of a soluble salt such as cobalt chloride (as employed in the examples), sulfate, nitrate or the like.

Similarly, cyanide ion is also known to result in improved yields and other advantages when added to the nutrient medium, and it is accordingly desirable to add cyanide ion to the nutrient media employed in the present process. While sodium cyanide, as employed in the examples, is a preferred source of cyanide ion for addition to the nutrient medium, any other suitable source of cyanide ion may be employed, preferably in the form of a soluble compound. Examples of such compounds include ammonium cyanide, metal, alkali metal, and alkaline earth metal cyanides, ferrocyanides, ferricyanides, as for example those of sodium, potassium, barium, calcium, strontium and the like. Liquid or gaseous hydrocyanic acid or hydrogen cyanide may also be employed for treatment of the nutrient medium to impart therein the desired amount of cyanide ion. As indicated above, an advantage of the present process resides in its capacity for tolerating higher amounts of cyanide ion ordinarily considered toxic to the microorganism. Accordingly, nutrient media may be employed containing from about 0.1 to 100 p.p.m. or more cyanide ion.

It has been pointed out above that optimum results are obtained when the microaerophilic fermentation is carried out in a nutrient medium thickened sufficiently to hold the bacteria in suspension and allowing the fermentation to proceed without agitation during about the initial 5 to 35% of the fermentation period and with agitation during the remainder of the period. The fermentation process is generally complete in about 6 days' time, the initial period without agitation usually being from about 12 to 48 hours. The agitation should be carried out gently and either intermittently or continuously, as for example with slowly moving paddles, or the like. With lactate as a source of assimilable carbon, the fermentation is customarily run on the acid side, generally at an initial pH of about 5.8 to 6.0. The pH gradually rises and the fermentation and production of cobalamins is stopped when the pH rises to about 6.5 to 7.1. The cobalamins tend to become unstable and generally are destroyed when much above this pH range.

Reference has been made to the use in the present process of bacteria of the genus Propionibacterium. The preferred species for use in the present improved microaerophilic fermentation process is *Propionibacterium freudenreichii*. While this invention will be illustrated by specific examples employing this species, it will be understood that the process is also applicable to and inclusive of the use of other species such as *P. shermanii, P. thoenii, P. rubrum, P. peterssonii, P. zeae, P. pentosaceum,* and *P. arabinosum,* as well as any other genera and species that are microaerophilic and produce cobalamins.

As disclosed above, a further feature of this invention resides in the use of malt extract or malted cereal extract in the nutrient medium. It is to be noted that Hargrove and Leviton in U.S. Patent No. 2,715,602 employ yeast extract as a source of growth factor and nutrient for the microorganism. From a commercial standpoint, yeast extract is expensive and would accordingly render large scale production of cobalamins extremely uneconomical. In U.S. Patent No. 2,816,856, it is proposed to substitute such yeast extract by autolyzed waste brewer's yeast. This substance is likewise often unavailable and/or expensive, and in addition must be further processed, i.e. autolyzed, prior to its use in the fermentation.

The malt extract and malted cereal extract employed in the present process may not only replace the yeast extract and the autolyzed waste yeast of the prior art, but are actually superior thereto. These malt products are adjuncts of the brewing industry, are relatively inexpensive, generally available, and require no processing prior to use herein. Further, their use herein enables the attainment of unexpectedly improved yields of cobalamins as compared with those previously obtainable with yeast extract.

The malt employed herein is generally a barley malt customarily employed in the brewing industry, although other cereal malts may be employed, as for example wheat malt or rice malt, or even corn malt, rye malt or oat malt, although these latter grains are seldom employed in making malt. The manufacture of the malt is of course a well known process in the brewing industry although it is also of importance in distilling, yeast making, vinegar, baking and the like. A barley malt will generally contain 72 to 76% solubles on a dry basis and will generally contain 60 to 70% carbohydrates, mostly starch, 10 to 14% proteins, 2 to 4% mineral salts, 10 to 13% cellulose, 4 to 5% moisture, and small amounts of fats and other substances. A complete description of malt and malted cereal extract, the malting process and the compositions of malt, may be found in Industrial Microbiology by S. C. Prescott and C. G. Dunn, 1940, pages 89 to 98 (McGraw-Hill Book Co., New York). The exact reason for the unexpectedly improved results attainable by the use of the malt extract or malted cereal extract is not definitely known, and may be attributable to the gross chemical nature or constitution of the malt, the presence of cobalamin precursors, or to a combination thereof, or other unknown reason. The malt or malted cereal extract is the extract resulting from the mashing of the malt in the brewing process and the extraction of the solubles therein. The malt extract or malted cereal extract may be employed in amounts of up to 3% in the nutrient medium, it being understood that the proportion thereof to be employed in any specific instance for optimum results will depend upon the various other substances present and the like. A proportion of about 1% in the medium is generally sufficient. Since the use of the malt extract or malted cereal extract is optional, though preferred, its concentration in the medium may be expressed as from 0 to 5%.

The following examples are only illustrative of the present invention and are not to be regarded as limitative. All parts and proportions referred to herein and in the appended claims are by weight unless otherwise indicated.

EXAMPLE I

*Effect of Replacement of Yeast Extract by Malt Extract or Malted Cereal Extract in the Fermentation Culture Medium*

A basic fermentation culture medium composed of

| | |
|---|---|
| Sodium lactate | 2.0%. |
| Dextrose | 0.2%. |
| NZA-Amine | 0.25%. |
| Cobalt ion | 0.1 mg. percent. |
| Cyanide ion | 0.1 mg. percent. |
| Water | Balance. | was prepared and divided into 200 ml. aliquots. To each aliquot, was added separately as follows.

Aliquot:
    A—control—nothing added
    B—yeast extract 1.0%
    C—malt extract 1.0%
    D—malted cereal extract 1.0%

The above aliquots were transferred to separate 250 ml. Erlenmeyer flasks, sterilized by autoclaving, cooled and inoculated with 2% by volume of a liquid culture of *Propionibacterium freudenreichii*. The cotton plug on each flask was covered with aluminum foil and the fermentation allowed to proceed at 28° C. with continuous stirring by means of a shaking machine which imparted a swirling motion to the contents of each flask.

After the fermentation had been allowed to proceed for six days, the fermentation liquors were assayed for vitamin $B_{12}$ activity by the methods and procedures described in the U.S. Pharmacopolia (XVI). The following results were obtained with respect to the separate aliquots.

| Aliquot: | Vitamin $B_{12}$ activity, mcgs./ml. |
|---|---|
| A | 0.00 |
| B | 1.00 |
| C | 1.55 |
| D | 1.60 |

EXAMPLE II

*Effect of Replacement of Yeast Extract by Malt Extract or Malted Cereal Extract in the Inoculum or Seed Culture Medium*

A basic inoculum or seed culture medium composed of:

| | |
|---|---|
| Dextrose | 1.0%. |
| NZA-Amine | 1.0%. |
| Potassium phosphate dibasic | 0.16%. |
| Potassium phosphate monobasic | 0.04%. |
| Cobalt ion | 0.1 mg. percent. |
| Cyanide ion | 0.1 mg. percent. |
| Water | Balance. | was prepared and divided into three aliquots. To one aliquot was added yeast extract 1.0%, to the second malt extract 1.0%, and to the third malted cereal extract 1.0%. It was unnecessary to utilize a control since preliminary experiments established that in the absence of the growth factor introduced by either yeast or malt no growth of the *Propionibacterium freudenreichii* organism took place on this culture medium.

Each of the above three aliquots of inoculum culture medium was inoculated with a loopful of material from a test tube agar culture of *Propionibacterium freudenreichii*. After incubation with stirring at 28° C. for 36 hours, it was used in 2% by volume quantity to inoculate flasks containing separate 200 ml. aliquots of fermentation culture medium described in Example I. After fermentation under conditions as described in Example I, the following results were obtained with respect to yields of vitamin $B_{12}$ activity:

| Aliquots of Inoculum culture medium | Fermentation aliquot | vitamin $B_{12}$ activity, mcgs./ml. |
|---|---|---|
| 1.0% yeast extract added to basic inoculum culture medium | A | 0.00 |
| | B | 1.15 |
| | C | 1.40 |
| | D | 1.50 |
| 1.0% malt extract added to basic inoculum culture medium | A | 0.00 |
| | B | 1.25 |
| | C | 1.60 |
| | D | 1.75 |
| 1.0% malted cereal extract added to basic inoculum culture medium | A | 0.00 |
| | B | 1.30 |
| | C | 1.70 |
| | D | 1.55 |

EXAMPLE III

*Effect of Adding a Thickening Agent (Agar) to the Fermentation Culture Medium in an Unstirred Fermentation*

To separate 200 ml. aliquots of the basic fermentation culture medium described in Example I, was added—

Aliquot:
    A—control
    B—yeast extract 1.0%
    C—yeast extract 1.0%, agar 0.1%
    D—malt extract 1.0%
    E—malt extract 1.0%, agar 0.1%
    F—malted cereal extract 1.0%
    G—malted cereal extract 1.0%, agar 0.1%

The above aliquots were transferred to separate test tubes, sterilized by autoclaving, cooled and inoculated with a 2% by volume quantity of a *Propionibacterium freudenreichii* culture grown on the basic inoculum culture medium with added yeast extract 1.0% as in Example II. After incubation unstirred, e.g., a static or still fermentation, at 28° C. for 7 days, the fermentation liquors were assayed for vitamin $B_{12}$ activity as in Example I. The following results were obtained.

Aliquot: Vitamin $B_{12}$ activity, mcgs./ml.
- A ---- 0.00
- B ---- 0.05
- C ---- 1.00
- D ---- 0.15
- E ---- 1.50
- F ---- 0.10
- G ---- 1.75

EXAMPLE IV

*Effect of Adding a Thickening Agent (Agar) to the Fermentation Culture Medium in a Stirred Fermentation*

The procedure of Example III was repeated, except that the fermentation culture medium in 200 ml. aliquots was transferred to 250 ml. Erlenmeyer flasks, and the fermentation in each case was allowed to proceed with stirring, e.g., swirling in a shaking machine. The fermentation liquors, when assayed for vitamin $B_{12}$ activity, yielded the following results in the separate aliquots.

Aliquot: Vitamin $B_{12}$ activity, mcgs./ml.
- A ---- 0.05
- B ---- 1.35
- C ---- 1.80
- D ---- 1.45
- E ---- 2.10
- F ---- 1.60
- G ---- 2.25

EXAMPLE V

*Effect of Adding a Thickening Agent (Agar) to the Inoculum Culture Medium in an Unstirred and Also in a Stirred Fermentation*

A measured quantity of the basic inoculum or seed culture medium described in Example II was prepared and divided into two aliquots. To these was added separately—

Aliquot:
  A—yeast extract 1.0%
  B—yeast extract 1.0%, agar 0.3%

Both aliquots were sterilized by autoclaving, cooled and inoculated with a loopful of material from a test tube agar culture of *Propionibacterium freudenreichii*. The aliquots were allowed to incubate unstirred at 28° C. for 30 hours.

The above procedure was repeated identically in every detail except that the aliquots were stirred during incubation.

Each of the above aliquots after incubation was used in 2% by volume quantity to inoculate 250 ml. Erlenmeyer flasks containing 200 ml. of sterilized fermentation culture medium consisting of the basic fermentation culture medium formula described in Example I to which had been added malted cereal extract 1.0%. The fermentation, unstirred in some flasks and stirred in others, was allowed to proceed at 28° C. for 7 days.

The following results were obtained with respect to yields of vitamin $B_{12}$ activity in the fermented liquors:

| Inoculum Aliquot | Inoculum Incubation | Fermentation | vitamin $B_{12}$ activity, mcgs./ml. |
|---|---|---|---|
| A | unstirred | unstirred | 0.00 |
| B | do | do | 1.55 |
| A | do | stirred | 0.10 |
| B | do | do | 2.75 |
| A | stirred | unstirred | 0.10 |
| B | do | do | 1.75 |
| A | do | stirred | 1.65 |
| B | do | do | 2.55 |

EXAMPLE VI

*Effect of Adding a Thickening Agent (Agar) to the Inoculum Culture Medium in a Part-Unstirred Part-Stirred Fermentation*

To a measured quantity of the basic inoculum culture medium of Example II was added yeast extract 1.0% and agar 0.3%. The mixture was sterilized by autoclaving, cooled, inoculated with a loopful of material from a test tube agar culture of *Propionibacterium freudenreichii* and incubated unstirred, as indicated by the results of Example V, at 28° C. for 30 hours. This inoculum was used in 2% by volume quantity to inoculate the basic fermentation culture medium of Example I to which malted cereal extract 1.0% had been added. In separate flasks, the fermentation was allowed to proceed at 28° C. for 7 days in three different ways:

A—unstirred throughout the entire 7 days
B—stirred throughout the entire 7 days
C—unstirred for 1 day followed by stirring for 6 days Under these differing conditions, the following results were obtained with respect to the yield of vitamin $B_{12}$ activity in the fermentation liquors.

Fermentation: Vitamin $B_{12}$ activity, mcgs./ml.
- A ---- 1.60
- B ---- 2.65
- C ---- 3.50

EXAMPLE VII

*Comparison of the Effects of Adding a Thickening Agent (Agar) to the Fermentation Culture Medium Only, to the Inoculum Culture Medium Only, and to Both, in a Part-Unstirred Part-Stirred Fermentation Cycle*

A measured quantity of the basic inoculum or seed culture medium described in Example II was prepared and divided into two aliquots. To these was added separately—

Inoculum aliquot:
  A—yeast extract 1.0%
  B—yeast extract 1.0%, agar 0.3%

Both aliquots were sterilized by autoclaving, cooled and inoculated with a loopful of material from a test tube agar culture of *Propionibacterium freudenreichii*. After incubation at 28° C. for 30 hours, the inoculum cultures so obtained were used in 2% by volume quantity to inoculate separate 250 ml. Erlenmeyer flasks each containing 200 ml. of the basic fermentation culture medium described in Example I and made up in two aliquots; to which was added separately—

Fermentation aliquot:
  A—malted cereal extract 1.0%
  B—malted cereal extract 1.0%, agar 0.1%

Upon fermentation of the above at 28° C. for 1 day unstirred followed by fermentation with stirring for 6 days, the following results were obtained with respect to yields of vitamin $B_{12}$ activity in the fermented liquors:

| Inoculum aliquot | Fermentation aliquot | vitamin $B_{12}$ activity, mcgs./ml. |
|---|---|---|
| A | A | 1.55 |
| B | A | 3.60 |
| A | B | 3.45 |
| B | B | 3.85 |

EXAMPLE VIII

The procedure of Example VII above was repeated identically in every detail except that starch 2.0% was used to replace agar 0.3% in aliquot B of the inoculum culture medium and starch 1.0% was used to replace agar 0.1% in aliquot B of the fermentation culture medium.

The following results with respect to yields of vitamin $B_{12}$ activity were obtained in the fermented liquors:

| Inoculum aliquot | Fermentation aliquot | Vitamin $B_{12}$ activity, mcgs./ml. |
|---|---|---|
| A | A | 1.40 |
| B | A | 3.75 |
| A | B | 3.65 |
| B | B | 4.10 |

EXAMPLE IX

*Effect of Adding Thickening Agent (Agar) to an Inoculum Culture Medium and Using Same in a Part-Unstirred Part-Stirred Fermentation Cycle Carried Out in 60 Gallon Volume Contained Within an Industrial Type Fermenter Commonly Referred to as a "Tank"*

A 60 gallon tank was charged with 200 liters of the basic fermentation culture medium described in Example I. To this was added malted cereal extract 1.0%. The mixture was sterilized by steam heating to 15 to 20 lbs. steam pressure for 20 minutes and then cooled. The sterilized mixture was inoculated with 4 liters of a *Propionibacterium freudenreichii* culture that had been incubated unstirred for 30 hours at 28° C. on a medium composed of the basic inoculum culture medium described in Example II, yeast extract 1.0% and agar 0.3%. Following inoculation, the fermentation was allowed to proceed unstirred for 24 hours at 28° C. Then the tank propeller was activated and the fermentation continued with gentle stirring at 28° C. for an additional period of 5 days, at the end of which time the vitamin $B_{12}$ activity of the fermented liquor had reached a maximum.

As a result of the above-described procedure, a yield of vitamin $B_{12}$ activity amounting to 3.90 mcgs./ml. was obtained in the fermented liquor.

At the termination of the above fermentation, the vitamin $B_{12}$ activity was extracted by precipitation, using methylene disalicylic acid according to the procedure devised in U.S. Patent No. 2,861,025 by Baron and Maxion, treated with sodium cyanide, the vitamin $B_{12}$ separated, purified further and precipitated finally as dark red crystals. When examined in the spectrophotometer, the final product proved to be beyond any doubt authentic vitamin $B_{12}$ or cyanocobalamin.

EXAMPLE X

*Effect of Adding a Thickening Agent (Agar) to a Fermentation Culture Medium and Using Same in a Part-Unstirred Part-Stirred Fermentation Cycle Carried Out in a 60 Gallon Tank*

The procedure of Example IX was repeated except that the fermentation culture medium was composed of the basic fermentation culture medium described in Example I with added malted cereal extract 1.0% and agar 0.1%, and the inoculum culture medium was made up of the basic inoculum culture medium described in Example II to which had been added yeast extract 1.0% only.

At the termination of the fermentation, a yield of vitamin $B_{12}$ activity amounting to 3.65 mcgs./ml. in the fermented liquor was obtained as a result of the above-described procedure.

EXAMPLE XI

*Effect of Adding a Thickening Agent (Agar) to Both the Inoculum Culture Medium and the Fermentation Culture Medium and Using Same in a Part-Unstirred Part-Stirred Fermentation Cycle Carried Out in a 60 Gallon Tank*

The procedure of Example IX and Example X was repeated in combination in that agar 0.3% as well as yeast extract 1.0% was added to the basic inoculum culture medium of Example II, and agar 0.1% as well as malted cereal extract 1.0% was added to the basic fermentation culture medium of Example I.

As a result of the above combined action, at the termination of the fermentation a yield of vitamin $B_{12}$ activity amounting to 4.15 mcgs./ml. in the fermented liquor was obtained.

EXAMPLE XII

*Effect When the Thickening Agent is Starch and is Added to the Inoculum Culture Medium in a Part-Unstirred Part-Stirred Fermentation Cycle Carried out in a 60 Gallon Tank*

The procedure of Example IX was repeated except that agar 0.3% in the inoculum culture medium was replaced by starch 2.0%.

At the termination of the fermentation, a yield of vitamin $B_{12}$ activity amounting to 3.90 mcgs./ml. in the fermented liquor was obtained as a result of the above-described procedure.

EXAMPLE XIII

*Effect of Adding to the Fermentation Culture Medium, Cobalt Ion in Concentration in Excess of the Level Commonly Regarded as Toxic (20 p.p.m.) in a Part-Unstirred Part-Stirred Fermentation Cycle*

A measured quantity of the basic fermentation culture medium described in Example I was divided into two aliquots, A and B, to which were added separately—

Aliquot:
  A—malted cereal extract 1.0%
  B—malted cereal extract 1.0%, cobalt ion 20 p.p.m.

Both aliquots were subdivided into 200 ml. volumes, transferred to 250 ml. Erlenmeyer flasks, sterilized by autoclaving, cooled and inoculated with a culture of *Propionibacterium freudenreichii*. The inoculum consisted of a 2% by volume amount of the basic inoculum culture medium of Example II with added yeast extract 1.0% and agar 0.3% which had been inoculated with a loopful of material from a test tube agar culture of *Propionibacterium freudenreichii* and incubated unstirred at 28° C. for 30 hours. Following inoculation, the Erlenmeyer flasks were covered with aluminum foil and their contents allowed to ferment at 28° C., unstirred for 1 day followed by 5 days of stirred fermentation.

At the termination of fermentation under the above-described conditions, the following results in the two aliquots were obtained with respect to the yields of vitamin $B_{12}$ activity to be found in the fermented liquors.

Aliquot:                              Vitamin $B_{12}$ activity, mcgs./ml.

A _____ 3.65
B _____ 4.25

EXAMPLE XIV

*Effect of Adding to the Inoculum Culture Medium, Cobalt Ion in Concentration in Excess of the Level Commonly Regarded as Toxic (20 p.p.m.) in a Part-Unstirred Part-Stirred Fermentation Cycle*

A measured quantity of the basic inoculum culture medium described in Example II was divided into two aliquots, A and B, to which were added separately—

Aliquot:
  A—yeast extract 1.0%, agar 0.3%
  B—yeast extract 1.0%, agar 0.3%, cobalt ion 20 p.p.m.

Both aliquots were sterilized by autoclaving, cooled and inoculated with a loopful of material from a test tube agar culture of *Propionibacterium freudenreichii*. After incubation unstirred at 28° C. for 30 hours, each aliquot was used separately in 2% by volume quantity to inoculate 250 ml. Erlenmeyer flasks each containing 200 ml. of the basic fermentation culture medium of Example I to which had been added malted cereal extract 1.0%. Following inoculation, the Erlenmeyer flasks were covered with aluminum foil and their contents allowed to ferment at 28° C. unstirred for 1 day followed by 5 days of stirred fermentation.

At the termination of fermentation under the above-described conditions, the following results in the two aliquots were obtained with respect to the yields of vitamin $B_{12}$ activity to be found in the fermented liquors.

| Aliquot: | Vitamin $B_{12}$ activity, mcgs./ml. |
|---|---|
| A | 3.60 |
| B | 3.95 |

EXAMPLE XV

*Effect of Adding to the Fermentation Culture Medium Both Cobalt Ion and Cyanide Ion in Concentrations in Excess of Levels Commonly Regarded as Toxic, 20 p.p.m. and 100 p.p.m. Respectively, in a Part-Unstirred Part-Stirred Fermentation Cycle*

The procedure of Example XIII was repeated except that to aliquot B was added not only cobalt ion 20 p.p.m. but also cyanide ion 100 p.p.m.

At the termination of fermentation under the above-described conditions, the following results in the two aliquots were obtained with respect to the yields of vitamin $B_{12}$ activity to be found in the fermented liquors.

| Aliquot: | Vitamin $B_{12}$ activity, mcgs./ml. |
|---|---|
| A | 3.65 |
| B | 4.60 |

EXAMPLE XVI

*Effect of Adding to the Inoculum Culture Medium, Both Cobalt Ion and Cyanide Ion in Concentrations in Excess of Levels Commonly Regarded as Toxic, 20 p.p.m. and 100 p.p.m. Respectively, in a Part-Unstirred and Part-Stirred Fermentation Cycle*

The procedure of Example XIV was repeated except that to aliquot B was added not only cobalt ion 20 p.p.m. but also cyanide ion 100 p.p.m.

At the termination of fermentation under the above-described conditions, the following results in the two aliquots were obtained with respect to the yields of vitamin $B_{12}$ activity to be found in the fermented liquors.

| Aliquots: | Vitamin $B_{12}$ activity, mcgs./ml. |
|---|---|
| A | 3.50 |
| B | 4.25 |

EXAMPLE XVII

*Effect When Cobalt Ion and Cyanide Ion in Concentrations in Excess of the Levels Commonly Regarded as Toxic, 20 p.p.m. and 100 p.p.m. Respectively, Are Added to the Fermentation Culture Medium for Use in the 60 Gallon Tank in a Part-Unstirred and Part-Stirred Fermentation Cycle*

The procedure of Example IX was repeated except that cobalt ion 20 p.p.m. and cyanide ion 100 p.p.m. as well as malted cereal extract 1.0% was added to the basic fermentation culture medium described in Example I.

At the termination of fermentation under the above-mentioned conditions, a yield of vitamin $B_{12}$ activity amounting to 5.15 mcgs./ml. was obtained in the fermented liquor.

EXAMPLE XVIII

*Effect When Cobalt Ion and Cyanide Ion in Concentrations in Excess of the Levels Commonly Regarded as Toxic, 20 p.p.m. and 100 p.p.m. Respectively, Are Added Both to the Inoculum Culture Medium and to the Fermentation Culture Medium for Use in the 60 Gallon Tank in Part-Unstirred Part-Stirred Fermentation Cycle*

The procedure of Example IX was once again repeated except that cobalt ion, 20 p.p.m., and cyanide ion, 100 p.p.m., as well as malted cereal extract, 1.0%, were added to the basic fermentation culture medium described in Example I, and cobalt ion, 20 p.p.m., and cyanide ion, 100 p.p.m., as well as yeast extract, 1.0%, and agar, 0.3%, were added to the basic inoculum culture medium described in Example II.

At the termination of fermentation under the above-mentioned conditions, a yield of vitamin $B_{12}$ activity amounting to 5.35 mcgs./ml. was obtained in the fermented liquor.

EXAMPLE XIX

*The Effect of Adding a Thickening Agent (Agar) to an Inoculum Culture Medium and Using Same to Inoculate Various Fermentation Culture Media Containing Lactic Acid, Dextrose, Molasses, Cobalt Ion and Cyanide Ion in the Indicated Combinations and Concentrations*

A measured quantity of inoculum culture medium was prepared according to the following formulation:

| | Percent |
|---|---|
| Dextrose | 1.0 |
| NZA-Amine | 1.0 |
| Potassium phosphate, dibasic | 0.16 |
| Potassium phosphate, monobasic | 0.04 |
| Malted cereal extract | 1.0 |
| Water | Balance |

The measured quantity was divided into two equal aliquots. To one was added agar 0.3%. No agar was added to the second.

Both aliquots were sterilized by autoclaving, cooled and inoculated with a loopful of material from a test tube culture of *Propionibacterium freudenreichii*. After incubation at 28° C. for 30 hours, the inoculum cultures so obtained were used in 2% by volume quantity to inoculate 250 ml. Erlenmeyer flasks, each containing 200 ml. of sterilized fermentation culture medium made up according to the following formulation:

| | Percent |
|---|---|
| Malted cereal extract | 1.0 |
| NZA-Amine | 0.25 |

To certain of these flasks were further added—

Flask:
   A—nothing (control)
   B—sodium lactate 2.0%, dextrose 0.2%
   C—dextrose 2.0%
   D—molasses 2.0%
   E—sodium lactate 2.0%, dextrose 0.2%, cobalt ion 1.0 mg. percent
   F—sodium lactate 2.0%, dextrose 0.2%, cyanide ion 1.0 mg. percent
   G—sodium lactate 2.0%, dextrose 0.2%, cobalt ion 1.0 mg. percent, cyanide ion, 1.0 mg. percent The fermentation in all flasks was allowed to proceed at 28° C. unshaken for 1 day followed by shaking for 6 days. At the end of the fermentation period, the following results were obtained with respect to the yields of vitamin $B_{12}$ activity in the fermentation liquors:

| Fermentation Culture Medium | Vitamin B$_{12}$ activity, mcgs./ml. | |
|---|---|---|
| | Inoculum Medium with 0.3% agar | Inoculum Medium without agar |
| A | 0.35 | 0.15 |
| B | 1.00 | 0.45 |
| C | 0.75 | 0.35 |
| D | 0.85 | 0.50 |
| E | 2.90 | 0.95 |
| F | 1.15 | 0.60 |
| G | 3.40 | 1.20 |

This invention has been disclosed with respect to certain preferred embodiments and various modifications and variations thereof will become obvious to the person skilled in the art. It is to be understood that such modifications and variations are to be included within the spirit and scope of this invention.

I claim:

1. In the production of cobalamins by the microaerophilic fermentation of an aqueous nutrient medium with bacteria of the genus Propionibacterium, the improvements comprising employing a fluid nutrient medium thickened with a sufficient amount of thickening agent to hold the bacteria in suspension and allowing the fermentation to proceed without agitation of said thickened medium containing said bacteria in suspension during about the initial 5 to 35% of the fermentation period and with agitation during the remainder of said period.

2. A process as defined in claim 1 wherein the Propionibacterium is *P. freudenreichii*.

3. A process as defined in claim 1 wherein the nutrient medium is thickened with agar.

4. A process as defined in claim 1 wherein the nutrient medium is thickened with starch.

5. In the production of cobalamins by the microaerophilic fermentation of an aqueous nutrient medium with bacteria of the genus Propionibacterium, the improvements comprising employing a fluid nutrient medium thickened with a sufficient amount of thickening agent to hold the bacteria in suspension and containing a member of the group consisting of malt extract and malted cereal extract, and allowing the fermentation to proceed without agitation of said thickened medium containing said bacteria in suspension during about the initial 5 to 35% of the fermentation period and with agitation during the remainder of said period.

6. A process as defined in claim 5 wherein the Propionibacterium is *P. freudenreichii*.

7. A process as defined in claim 5 wherein the nutrient medium is thickened with agar.

8. A process as defined in claim 5 wherein the nutrient medium is thickened with starch.

9. A process as defined in claim 1 wherein the nutrient medium contains a source of cobalt ion.

10. A process as defined in claim 1 wherein the nutrient medium contains a source of cyanide ion.

11. A process as defined in claim 1 wherein the nutrient medium contains a lactate as a source of assimilable carbon.

References Cited in the file of this patent

UNITED STATES PATENTS

| 2,650,896 | McDaniel | Sept. 1, 1953 |
| 2,715,602 | Hargrove et al. | Aug. 16, 1955 |
| 2,886,490 | Marco et al. | May 12, 1959 |
| 2,910,410 | Corman | Oct. 27, 1959 |

OTHER REFERENCES

Basic Bacteriology by Lammanna et al., published by The Williams and Wilkins Company, Baltimore, 1953, pages 246 to 252.